Patented Feb. 6, 1923.

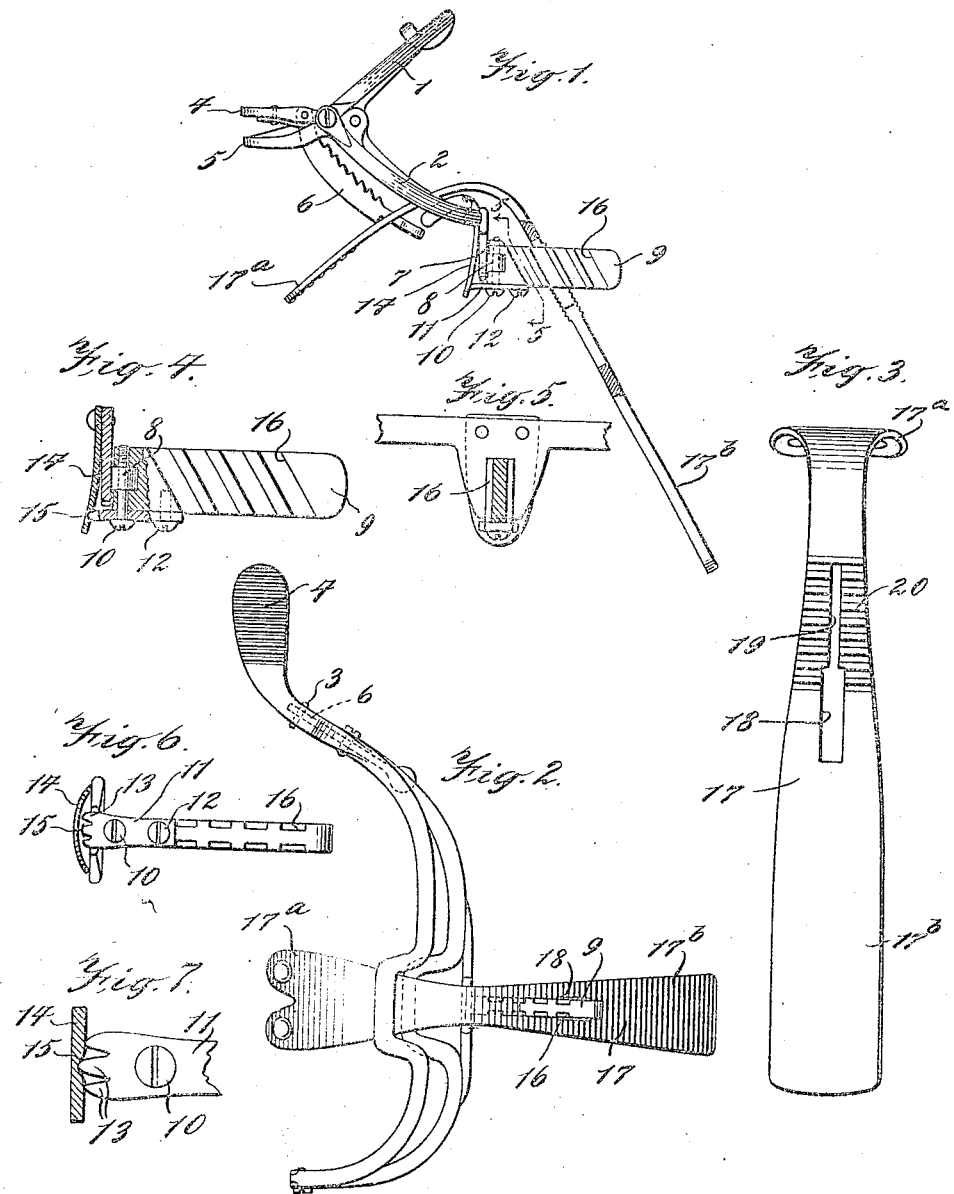

1,444,370

UNITED STATES PATENT OFFICE.

JOSEPH DUKE, OF NEW YORK, N. Y.

COMBINATION MOUTH GAG AND TONGUE DEPRESSOR.

Application filed May 14, 1921. Serial No. 469,536.

*To all whom it may concern:*

Be it known that I, JOSEPH DUKE, a citizen of the United States, residing at New York, in the county of Bronx and State of New York, have invented certain new and useful Improvements in Combination Mouth Gags and Tongue Depressors, of which the following is a full, clear, and exact description.

This invention relates to mouth gags and tongue depressors and has for an object to provide a combined gag and depressor in which the depressor can be adjusted posteriorly or anteriorly to accord with the size of the patient's mouth or to secure the necessary forward traction, or selectively to one side or the other of the mouth without releasing the tongue, or upwardly and downwardly to exert the desired pressure upon the tongue, in which the depressor and gag can be used separately if desired, and without interfering or projecting parts, in which the depressor is firmly held in adjusted positions with respect to the gag, and which is simple and inexpensive. Other objects and advantages will be apparent from the following description and the novel features of the invention will be particularly pointed out in claims.

In the accompanying drawing:

Fig. 1 is an elevation of a combined mouth gag and tongue depressor which has been constructed in accordance with my invention;

Fig. 2 is a plan of the same;

Fig. 3 is an elevation of the tongue depressor;

Fig. 4 is a transverse section through a portion of the lower member to better show certain of the details;

Fig. 5 is a section taken substantially along the line 5—5 of Fig. 1;

Fig. 6 is a bottom plan of a portion of the lower member; and

Fig. 7 is a section of certain details.

In the illustrated embodiment I may utilize any suitable mouth gag comprising relatively movable upper and lower members 1 and 2, which when separated hold the mouth in an open position, the members in the illustrated type of gag being hinged at their ends by pivots 3 and operable by handles 4 and 5 at one end to separate the members. The members are held in any degree of separation by means of a ratchet device 6 which may be released when the members are to be moved together. The details of the gag per se form no part of the present invention, and relate thereto only in combination with the tongue depressor to be presently described. The lower member is provided with a downwardly extending projection 7 carrying a lug 8 upon its forward face. An arm or element 9 has a slotted end portion which engages over the lug 8 and is pivoted thereto by means of a screw 10 which passes through the slotted end of the arm 9 and through the lug 8. The arm 9 may therefore be swung from side to side of the gag as desired.

Upon the lower face of the arm 9 I provide a rearwardly extending member 11 secured thereto by the screw 10 and by an additional screw 12, the rearward end having formed therein a plurality of teeth 13 arranged along an arc having a center of curvature in the axis of the pivot screw 10. A spring plate 14 is secured in any suitable manner to the lower member 2 of the gag in the rear of the projection 7 and presses against the toothed end of the member 11. The member 14 may be arcuately shaped at its free end so as to generally conform to the curvature of the ends of the teeth 13. The member 14 may have a depression or aperture 15 therein directly to the rear of the pivot screw 10 and in the path of movement of the teeth 13. As the arm 9 is swung from side to side of the gag about its pivot 10, the teeth 13 will consecutively drop into the depression 15 and yieldingly hold the arm 9 in a plurality of intermediate swinging positions. Thus the arm may be yieldingly held in a straight-out position such as indicated, for example, in the drawings, or it may be swung through a slight angle to either side of the straight-out position and yieldingly held in these positions. If desired, the arm 9 may be swung entirely to one side so as to be in an unobstructive position during the ordinary use of the mouth gag and be yieldingly held in this position by the pressure of spring member 14 against the side of the member 11. The arm 9 is provided on its side faces with a plurality of transversely and preferably also obliquely extending grooves 16, the grooves on the opposite faces being in alignment.

A tongue depressor 17 such as illustrated in detail in Fig. 3 on a scale slightly larger than that of Figs. 1 and 2, may be utilized by the operator independently of the gag and may also be attached to and carried by the arm 9. To this end the depressor is provided with a slot 18 intermediate of its ends which is of a size and shape to receive the arm 9 and be slid from end to end thereon. A second slot 19 opening at one end into the slot 18 is of a width corresponding substantially to that between the oppositely disposed slots 16 of the arm 9. The depressor may be disposed upon the arm 9 by passing the slot 18 over the arm and when the depressor has been brought into alignment with any of the pairs of grooves 16 the narrower slot 19 may be engaged in a pair of the grooves by a downward movement of the depressor. This engagement of the slot 19 with the grooves 16 prevents adjustment along the arm 9 in either direction, and if pressure is applied to either end of the depressor, the latter will be cramped in the groove and held against movement upwardly and downwardly. The depressor in the portion adjacent the slot 19 may have small corrugations or a roughness 20 on both faces for assisting in preventing relative up and down movements with respect to the arm 9 when the depressor is cramped in one of the pairs of the grooves 16.

In the use of my improved device the members 1 and 2 are inserted into the patient's mouth and engaging the upper and lower jaws, the handle members 4 and 5 are pressed together so as to separate the members 1 and 2 and open the mouth to the desired extent, the ratchet 6 holding the members in the opened position. The tongue depressor may be inserted in the mouth and used to hold the tongue in a depressed condition in a manner now commonly practiced, or the arm 9 may be swung from one of its extreme sidewise positions to a straight-out position and the depressor secured thereto. In the latter case the depressor will be disposed with the slot 18 around the arm 9 and then shifted anteriorly or posteriorly to the desired extent. The depressor will then be shifted downwardly in the adjacent pair of grooves 16 so as to bring the tongue-engaging end 17$^a$ of the depressor against the tongue and exert a desired pressure thereon. The pressure upon the tongue-engaging end of the depressor will rock the same about the grooves 16, in which it is disposed, as a pivot and cause a binding of the depressor in the grooves which will prevent upward or downward movement of the depressor. If one desires to release the tongue the opposite or downward end 17$^b$ of the depressor will be shifted to overcome the binding effect in the groove, and permit shifting of the depressor upwardly the desired amount, the pressure between the tongue engaging end of the tongue upon release of the depressor serving to hold the latter in the adjusted position by clamping the same in its grooves 16. If one desires to shift the tongue depressor to one side or the other of the mouth so as to be in a less obstructive position, or so as to hold the tongue down more firmly on either side, it is merely necessary to shift the arm 9 sidewise to a slight extent without releasing the depressor from the tongue. The teeth 13 during this shifting of the depressor, will ride over the spring member 14 and yieldingly hold the arm 9 in either of its laterally adjusted positions.

The depressor can very quickly be shifted anteriorly or posteriorly by merely shifting the depressor upwardly to bring the slot 18 around the arm 9 which will permit of the movement of the depressor inwardly or outwardly of the mouth after which a movement downwardly will engage the narrow slot 19 with the adjacent grooves 16 and prevent further inward or outward movement of the depressor. If the depressor is to be utilized separately, it is merely necessary to remove the same from the arm 9 and swing the latter through an angle of 90° to one of its extreme sidewise positions where it will be yieldingly held in an unobstructing position, and the depressor may be manually manipulated, or laid aside if it is not to be used at all.

In practice I have found that the preferred oblique angle of the slots 16 is approximately 30° to a perpendicular to the longitudinal axis of the arm 9 but this can be varied somewhat. The teeth 13 are preferably spaced apart an amount which will hold the arm 9 in positions approximately $22\frac{1}{2}$° to either side of and in addition to its straight out position. It will be observed that no set screws or ratchets are utilized in the adjustment or manipulation of the depressor in connection with the gag, and that the device permits of a natural control of downward pressure upon the tongue.

It will be obvious that various changes in the details and arrangements herein described and illustrated may be made by those skilled in the art within the principle and scope of the invention.

I claim:

1. In a combined mouth gag and tongue depressor, a pair of relatively moving jaw separating members, an extension pivoted on one of said members for movement from side to side, and a tongue depressor detachably carried by the extension.

2. In a combined mouth gag and tongue depressor, a pair of relatively moving jaw separating members, an extension pivoted on one of said members for movement from side to side, and a tongue depressor detachably carried by the extension and adjustable anteriorly and posteriorly.

3. In a combined mouth gag and tongue depressor, a pair of relatively moving jaw separating members, an element pivoted to one of the members for movement to either side when not in use, and from side to side during use, means for yieldingly holding the element in a plurality of intermediate side to side movements, and a tongue depressor detachably carried by the element.

4. In a combined mouth gag and tongue depressor, a pair of relatively moving jaw separating members, an element pivoted to one of the members for movement to either side when not in use, and from side to side during use, means for yieldingly holding the element in a plurality of intermediate side to side movements, and a tongue depressor detachably carried by the element and adjustable thereon upwardly and downwardly to exert the desired pressure upon the tongue.

5. In a combined mouth gag and tongue depressor, a pair of relatively moving jaw separating members, an element pivoted to one of the members for movement to either side when not in use, and from side to side during use, means for yieldingly holding the element in a plurality of intermediate side to side movements, and a tongue depressor detachably carried by the element and adjustable thereon upwardly and downwardly to exert the desired pressure upon the tongue, and also anteriorly and posteriorly to accord with the size of a patient's mouth.

6. In a combined mouth gag and tongue depressor, a pair of relatively moving jaw separating members, an element pivoted to one of the members for movement to either side when not in use, and from side to side during use, means for yieldingly holding the element in a plurality of intermediate side to side movements, said element having a plurality of transversely extending slots, and a tongue depressor having a slot therein for receiving the element and engaging in any of the slots therein to provide the desired anterior or posterior adjustment, the rocking of the depressor in the slot serving to bind the depressor in any desired position of its lengthwise adjustment and thereby determine the pressure upon the tongue.

7. In a combined mouth gag and tongue depressor, a pair of relatively moving jaw separating members, a forwardly extending element on one of said members and having a plurality of transversely extending grooves, and a tongue depressor having a slotted portion for receiving the element and for engaging selectively in any one of the grooves to provide the anterior and posterior adjustment of the depressor and adjustable in the grooves to provide the desired pressure of the depressor upon the tongue.

8. In a combined mouth gag and tongue depressor, a pair of relatively moving jaw separating members, an element pivoted to the forward side of one of said members, swinging from side to side of the members, and having therein a plurality of transversely extending grooves, and a tongue depressor having a slotted portion for receiving the element and for engaging selectively in any one of the grooves to provide the anterior and posterior adjustment of the depressor, and adjustable in the grooves to provide the desired pressure of the depressor upon the tongue.

9. In a combined mouth gag and tongue depressor, a pair of relatively moving jaw separating members, an element pivoted to the forward side of one of said members, swinging from side to side of the members, and having therein a plurality of transversely extending grooves, a tongue depressor having a slotted portion for receiving the element and for engaging selectively in any one of the grooves to provide the anterior and posterior adjustment of the depressor, and adjustable in the grooves to provide the desired pressure of the depressor upon the tongue, a plurality of teeth carried by the element and arranged arcuately of the pivot of the element, and a spring member carried by the member to which the element is pivoted and abutting the teeth for yieldingly holding the element in a plurality of positions in its movement about its pivot.

10. In a combined mouth gag and tongue depressor, a pair of relatively moving jaw separating members, an element pivoted to the forward side of one of said members, swinging from side to side of the members, and having therein a plurality of transversely extending grooves, a tongue depressor having a slotted portion for receiving the element and for engaging selectively in any one of the grooves to provide the anterior and posterior adjustment of the depressor, and adjustable in the grooves to provide the desired pressure of the depressor upon the tongue, a plurality of teeth carried by the element and arranged arcuately of the pivot of the element, and a spring member carried by the member to which the element is pivoted and abutting the teeth for yieldingly holding the element in a plurality of positions in its movement about its pivot, said spring member having a depression in the surface engaged by the teeth into which the teeth may drop one at a time when brought into alignment therewith.

11. In a combined mouth gag and tongue depressor, a pair of relatively moving jaw separating members, an element extending forwardly from one of the members and having transversely extending grooves, and a tongue depressor having one slot therein for receiving the element and enabling adjustment of the depressor anteriorly and posteriorly, and a second narrower slot opening into the said one slot for engaging the element in the grooved portion for preventing further anterior or posterior adjustment of the depressor but permitting transverse adjustment to vary the pressure upon the tongue.

12. In a combined mouth gag and tongue depressor, a pair of relatively moving jaw separating members, an element pivoted to one of the members for swinging movement from side to side thereof, said element having transversely extending grooves, and a tongue depressor having one slot therein for receiving the element and enabling adjustment of the depressor anteriorly and posteriorly, and a second narrower slot opening into the said one slot for engaging the element in the grooved portion for preventing further anterior or posterior adjustment of the depressor but permitting transverse adjustment to vary the pressure upon the tongue.

13. In a combined mouth gag and tongue depressor, a pair of relatively moving jaw separating members, an element pivoted to one of the members for swinging movement from side to side thereof, said element having transversely extending grooves, a tongue depressor having one slot therein for receiving the element and enabling adjustment of the depressor anteriorly and posteriorly, and a second narrower slot opening into the said one slot for engaging the element in the grooved portion for preventing further anterior or posterior adjustment of the depressor but permitting tranverse adjustment to vary the pressure upon the tongue, and means for yieldingly holding the element in a plurality of its swinging positions.

In witness whereof, I hereunto subscribe my signature.

JOSEPH DUKE.